Dec. 29, 1964   C. M. WESTFALL   3,163,449
PIPE JOINT
Filed June 20, 1961
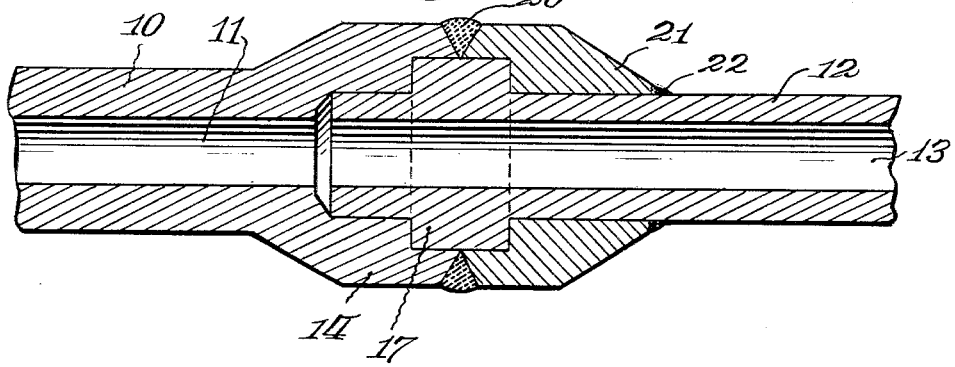
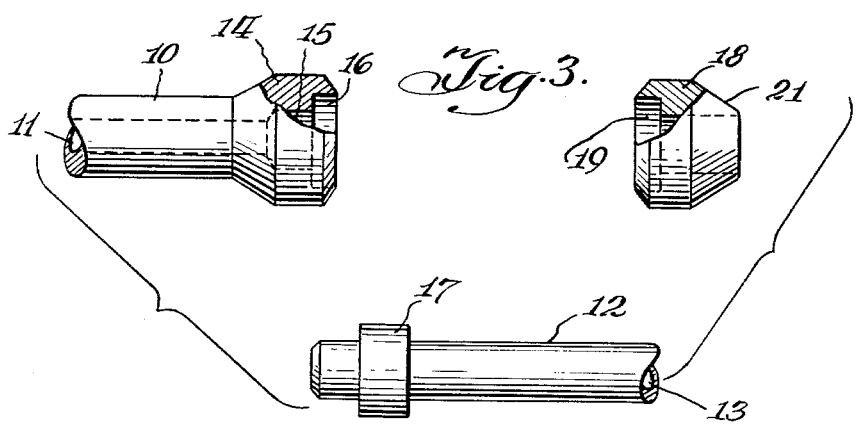
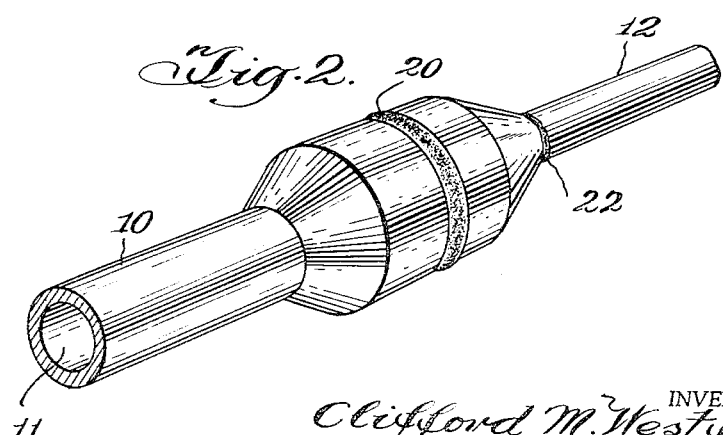
INVENTOR.
Clifford M. Westfall
BY
Merriam, Smith & Marshall
Attorneys 3,163,449
PIPE JOINT
Clifford M. Westfall, Peotone, Ill., assignor to Chicago Bridge & Iron Company, Chicago, Ill., a corporation of Illinois
Filed June 20, 1961, Ser. No. 118,297
5 Claims. (Cl. 285—187)

This invention relates to an improved pipe joint for joining dissimilar metals to transport very cold liquids such that a conventional pipe joint cannot be used.

It is common to store normally gaseous materials in the liquid state at essentially atmospheric pressure such as oxygen at a temperature of —297° F., hydrogen at —423° F., and methane at —258° F., in double walled insulated storage tanks. A typical cryogenic liquid storage vessel consists of an inner aluminum tank suspended within an outer carbon steel shell. Ordinary steels become brittle at low temperatures and therefore the inner tank is usually constructed of an aluminum alloy. The structural qualities of aluminum are actually improved at very low temperatures. The connecting piping between the inner vessel and its adjacent facilities, however, is generally, because of its low heat transfer characteristics, stainless steel. The problem of transition, therefore, results between the aluminum inner vessel and the desired stainless steel transfer pipes. Usually, the transition is made in the insulated annular space between the two vessel walls and because this space is sealed, usually a trouble-free transition joint is therefore essential.

It is very difficult to join aluminum to stainless steel by normal welding or soldering techniques so as to afford great structural strength. When aluminum is placed in contact with stainless steel and subjected to soldering temperatures a brittle intermetallic forms in the transition zone. This brittle intermetallic is highly susceptible to cracking when stressed at low temperatures. Thus, special techniques have to be used to effect a transition joint. The instant invention provides a joint which is durable, rigid, easily constructed and is leaktight.

The instant invention eliminates the need for fiber seals, which will not withstand the above described conditions.

In the diagrammatic drawings:
FIGURE 1 is a cross-sectional view of the pipe joint in its assembled form;
FIGURE 2 is a perspective view of the exterior of the pipe joint of the invention; and
FIGURE 3 is a disassembled view of the pipe joint showing the steel pipe, the aluminum pipe and the aluminum collar.

Referring to the illustrative drawing, there is shown in FIGURE 1 a pipe 10 which has a longitudinal bore 11 therein, and a pipe 12 having a longitudinal bore 13 therein aligned with the bore 11. The end of pipe 10 has an enlarged portion 14 which has a first enlarged bore 15 and a second enlarged bore 16. A thrust member 17 is formed integral with the pipe 12 preferably by machining but it can be welded thereon, if desired. The end of the pipe 12 and the thrust member 17 are telescopically received in the bores 15 and 16, respectively, of the enlarged portion 14. A collar 18 having a bore 19 is shrunk onto the pipe 12 and is welded to the enlarged portion 14 by the weldment 20. The diameter of the bores 16 and 19 are each smaller than the diameter of the thrust member 17, and the diameter of the bore 15 is smaller than the corresponding diameter of the end of the pipe 12 at room temperature. The diameter of the bores 15, 16 and 19 are sized so as just to provide sufficient clearance for the collar to be slid onto the pipe 12 and for the pipe 12 and its collar 18 to be slid into the pipe 10 when the pipe 10 and the collar 18 are heated during the shrink fitting step. The weldment 20 extends to the thrust member 18 as is shown in FIGURE 1.

The pipe 10 and the collar 18 are composed of aluminum or one of its alloys whereas the pipe 12 is composed of steel preferably of the stainless steel family. The weldment 20 is composed of any suitable welding material which will afford the required strength at low temperatures, aluminum being a suitable welding material. The side of the collar opposite the side which receives the weldment 20 tapers to the size of the pipe 12 as indicated at 21. The collar 18 is welded to the pipe 12 by a brazement 22. The brazement 22 prevents the joint from leaking should the shrink fit of the pipe 10 and the collar 18 on the pipe 12 be insufficient. The brazement material is a silver wire and is formed with an inert gas tungsten arc process.

In practicing the method of the invention the end of pipe 10 and the collar 18 are heated to approximately 600° F. The collar 18 is then slid around the end of the pipe 12 and the end of the pipe 12 and the collar 18 are slid into the bores 15 and 16, respectively. When the pipes 10 and 12 and the collar 18 are assembled, the aluminum pipe 10 and the aluminum collar 18 are allowed to cool until they shrink around the steel pipe 12, at which time the collar 18 and the end of the pipe 10 are welded together. Of course, the collar can be shrunk on first and later the aluminum pipe can be shrunk onto the steel pipe. The pipe 12 and the collar 18 are then brazed as indicated at 22. Upon cooling, the aluminum pipe 10 and the aluminum collar 18 shrink tightly around the steel pipe 12. Since the coefficient of thermal contraction and expansion is greater for aluminum than stainless steel, the aluminum pipe and collar continue to tighten on the steel pipe when subjected to the low temperatures involved with cryogenic liquid storage.

By way of a specific example, but in no sense intending to limit the scope of the invention, the following materials are used. The aluminum pipe is composed of 0.4–0.8% silicon, 0.7% iron, 0.15–0.40% copper, 0.15% manganese, 0.8–1.2% magnesium, 0.25% zinc, 0.15% titanium, 0.15–0.35% chromium, 0.15% impurities, and the remainder aluminum.

The aluminum weld rod is composed of 4.5–6.0% silicon, 0.8% iron, 0.30% copper, 0.05% manganese, 0.05% magnesium, 0.10% zinc, 0.20% titanium, 0.15% impurities, and the remainder aluminum. The steel pipe is composed of 0.03% carbon, 2.0% manganese, 0.045% phosphorus, 0.03% sulphur, 1.00% silicon, 18.00–20.00% chromium, 8.00–12.00% nickel.

The above-described embodiment and method being exemplary only, it will be understood that the present invention comprehends organizations and methods differing in form or detail from the presently described embodiment and method. Accordingly, the invention is not to be considered as limited save as is consonant with the scope of the following claims.

What is claimed is:
1. A pipe joint comprising:
a first pipe;
an enlarged portion at an end of said first pipe;
a first bore in said enlarged portion;
said first bore being in communication with and having an internal diameter greater than the interior of the first pipe;
a second bore in said enlarged portion, outwardly of said first bore;
said second bore being in communication with and having an internal diameter gerater than said first bore;
a second pipe;
a thrust member on said second pipe and set back from an adjacent first end portion of the second pipe, between said first end portion and an intermediate pipe portion;

said thrust member having an external diameter greater than the external diameter of the second pipe;

said first end portion of the second pipe being snugly received within said first bore of the enlarged portion on the first pipe;

one portion of said thrust member being snugly received within said second bore;

a collar having a pair of communicating bores, one of said bores having an internal diameter larger than the other bore;

said one bore snugly enveloping the unreceived other portion of said thrust member;

said other bore snugly enveloping said intermediate portion of the second pipe adjacent the thrust member;

said collar and said enlarged portion having mutually facing spaced surfaces;

and a weldment sealing the gap between said facing surfaces;

said first pipe, said enlarged portion, and said collar being composed of a first metallic material;

said second pipe and thrust member being composed of a second metallic material having a coefficient of expansion less than that of said first metallic material;

said first and second bores of the enlarged portion having internal diameters, at room temperature and in a disassembled condition, smaller than the external diameters of the second pipe's first end portion and thrust member respectively;

said one and other bores of said collar having internal diameters, at room temperature and in a disassembled condition, smaller than the external diameter of the second pipe's thrust member and intermediate portion respectively.

2. A pipe joint as recited in claim 1 and comprising: a brazement around the second pipe's intermediate portion at an end of said collar opposite said facing surface thereof to effect a seal around said pipe.

3. A pipe joint as recited in claim 1 wherein: said mutually facing surfaces on said collars and said enlarged portion converge inwardly toward said thrust member;

and said weldment extends to said thrust member.

4. A pipe joint comprising:
a first pipe;
an enlarged portion at an end of said first pipe;
a first bore in said enlarged portion;

said first bore being in communication with and having an internal diameter greater than the interior of the first pipe;

a second bore in said enlarged portion, outwardly of said first bore;

said second bore being in communication with and having an internal diameter greater than said first bore;

a second pipe;

a thrust member on said second pipe and set back from an adjacent first end portion of the second pipe, between said first end portion and an intermediate portion;

said thrust member having an external diameter greater than the external diameter of the second pipe;

said first end portion of the second pipe being snugly received within said first bore of the enlarged portion on the first pipe;

one portion of said thrust member being snugly received within said second bore;

a collar having a pair of communicating bores, one of said bores having an internal diameter larger than the other bore;

said one bore snugly enveloping the unreceived other portion of said thrust member;

said other bore snugly enveloping said intermediate portion of the second pipe adjacent the thrust member;

said collar and said enlarged portion having mutually facing spaced surfaces;

and a weldment sealing the gap between said facing surfaces;

said first pipe, enlarged portion and collar all being composed of a first metallic material;

said second pipe and thrust member both being composed of a second metallic material having a coefficient of expansion less than that of said first metallic material.

5. A pipe joint as recited in claim 4 and comprising a brazement around said second pipe at an end of said collar opposite said facing thereof to effect a seal around said pipe.

References Cited in the file of this patent
UNITED STATES PATENTS

| | | |
|---|---|---|
| 414,686 | Dinn | Nov. 12, 1889 |
| 1,262,263 | Rust | Apr. 9, 1918 |
| 2,001,204 | Long et al. | May 14, 1935 |
| 2,878,040 | Hobbs | Mar. 17, 1959 |